United States Patent Office 2,969,322
Patented Jan. 24, 1961

2,969,322

PREPARATION OF WELL PACKER FLUIDS

Walter J. Weiss, Sugar Land, and Clarence O. Walker and John S. Brukner, Houston, Tex., assignors to Texaco Inc., a corporation of Delaware No Drawing. Filed Apr. 16, 1958, Ser. No. 728,774

15 Claims. (Cl. 252—8.55)

This invention relates to well packer fluids or well completion fluids. In accordance with one embodiment this invention relates to the preparation of a well packer fluid or well competion fluid from the drilling fluid employed during the drilling of the well bore. In accordance with another embodiment this invention is directed to the preparation of a well packer fluid from a limed or lime base drilling fluid.

Well packer fluids are fluids which are retained in the well bore during well completion operations, well workover operations and the like. Usually well packer fluids remain or are retained in a well bore under quiescent conditions for a prolonged period of time. Oftentimes a well packer fluid having a relatively high density, e.g., in the range 15–22 lbs. per gallon, higher or lower, must be employed. Accordingly in a well packer fluid having a relatively high density it is desirable that its gel strength be sufficient so that it is able to retain the added weighting material in suspension therein. Desirably, also, since a well packer fluid is retained under quiescent conditions in the well bore wherein it may be exposed to an elevated temperature for a substantial period of time the high temperature properties of a well packer fluid should be such that it does not set up therein into a cement-like or rock-like material upon exposure to high temperature. A well packer fluid should be able to retain solids such as weighting material in suspension therein for a relatively long period of time under conditions of high temperature, e.g., 275° F. and higher, without setting to a rock-like material and eventually, after having been exposed to a high temperature for an extended period of time, be able to be fluidized and readily displaced from the well bore by pumping or fluid displacement and the like.

Accordingly, it is an object of this invention to provide an improved method for the preparation of a well packer fluid or well competion fluid from the drilling fluid employed in the drilling of the well.

Another object of this invention is to provide a method for the preparation of a well packer fluid having improved high temperature properties.

Still another object of this invention is to provide a method for the preparation of a well packer fluid from a limed or lime base mud.

Yet another object of this invention is to provide a method for the preparation of a relatively inexpensive and readily effective well packer fluid.

How these and other objects of this invention are accomplished will become apparent in the light of the accompanying disclosure. In at least one embodiment of the practice of this invention at least one of the foregoing objects will be achieved.

In accordance with this invention we have provided a method for the preparation of a well packer fluid or well completion fluid from a conventional or ordinary drilling mud, such as a limed or lime base drilling mud, by treating the drilling mud so as to reduce its water content and then admixing the resulting dewatered drilling fluid with water together with a viscosity increasing agent or a weight suspending agent, the amount of water and viscosity increasing agent or weight suspending agent being admixed with the dewatered mud being adjusted so as to impart to the resulting fluid an alkalinity, $P_m$, not greater than about 5.0. The alkalinity value $P_m$ of a fluid or mud is determined by measuring the number of ccs. of N/50 $H_2SO_4$ required to titrate a 1 cc. sample of the whole mud.

In carrying out the practice of this invention the dewatering operation may be carried out by any suitable means whereby water, actually a portion of the aqueous phase of the drilling fluid undergoing treatment, is removed. Suitable means for effecting dewatering or removal of a portion of the aqueous phase of the drilling mud undergoing treatment or conversion into a well packer fluid or well completion fluid, include the centrifuge such as mud centrifuge used for effecting separation of heavy solids material from a drilling mud, filters, settlers, hydraulic cones or separators and the like.

In accordance with one method of the practice of this invention a drilling fluid to be converted into a well packer fluid is passed to a dewatering device, such as a mud centrifuge. There is recovered from the mud centrifuge a partially dewatered drilling mud, sludge-like in appearance, having a substantially increased density or weight per gallon (about 20 lbs. per gal.) and reduced water content with respect to the drilling fluid supplied to the dewatering device. The resulting partially dewatered drilling fluid or sludge is then directly introduced into an aqueous solution of carboxymethylcellulose, such as an aqueous solution of Driscose. Usually an amount of dewatered drilling fluid or sludge is added sufficient to form an admixture having a density or weight corresponding to that of the drilling fluid originally supplied to the mud centrifuge, about 2 volumes of the relatively high density mud sludge when added to 1 volume of the aqueous solution of carboxymethylcellulose, such as a solution containing 3 lbs. of carboxymethylcellulose per barrel (42 gals.) of water, yields a resulting fluid admixture suitable as a well packer fluid and having a density or weight in the range 16–18 lbs. per gallon. The resulting fluid admixture or packer fluid generally exhibits a relatively low viscosity and 0–0 gels and will exhibit relatively little, if any, tendency to "settle-out" the weighting material and other solids therein. It has been observed that when such a fluid admixture is subjected to an elevated temperature, such as a temperature of 350° F., for a period of 24 hours very little gel developed and the thus-treated fluid admixture was readily refluidized to yield a fluid which had even a lower viscosity than the original mud from which it was derived and which had been charged to the mud centrifuge. Further, it was observed that the alkalinity $P_m$ of the resulting fluid admixture also was relatively low, about 3.0.

Another method in the practice of this invention for the preparation of a well packer fluid involves a two-step or two-stage dewatering operation. In the first stage the drilling fluid to be converted is dewatered, such as by passage through a mud centrifuge, so as to recover therefrom a relatively high density mud or sludge, the density of which is substantially greater than that of the mud charged to the centrifuge. Effective conversions are obtained if the density of the resulting heavy sludge is substantially greater than that of the original mud, e.g., in the range 2–10 lbs. per gallon greater than the original mud, such as a sludge having a weight of about 20 lbs. per gallon derived from a mud having a weight in the range 14–18 lbs. per gal., e.g., 17 lbs. per gal. The resulting sludge is then treated by adding water thereto so that the density of the resulting watered sludge is approximately that of the original mud. During the addition of water to the heavy sludge, or after the addition of water thereto, a viscosity increasing agent or weight suspending agent is added thereto so as to avoid settling of the solids and weighting material within the resulting watered sludge.

It has been observed that muds when subjected to the foregoing treatment have had the high temperature shear value thereof substantially reduced, such as from a value of from about 6500 lbs. per hundred sq. ft. to a value of about 2085 lbs. per hundred sq. ft. At the same time the mud alkalinity $P_m$ is reduced from a value of 7.0, corresponding to the mud alkalinity of the original mud, to a value of about 4.0, corresponding to the alkalinity of the resulting watered sludge.

The above operations were repeated on the resulting watered sludge, i.e., the watered sludge being dewatered to about a density of 20 lbs. per gallon, the resulting sludge again watered to a density of about 17 lbs. per gallon and carboxymethylcellulose in an amount of about 3 lbs. per barrel of water added thereto. As a result of the foregoing operations there was recovered a modified and converted drilling fluid suitable for use as a well packer fluid or well completion fluid having an alkalinity of about 3.0 and a high temperature shear of about 500 lbs. per hundred sq. ft.

As indicated hereinabove, the practice of this invention is particularly useful for the conversion of a limed or lime base mud into a well packer fluid or well completion fluid. The practice of this invention is applicable for a so-called low limed mud or to a so-called high limed mud containing lime and caustic soda (NaOH), wherein the lime $Ca(OH)_2$ content of the mud is in the range 1–3 and 3–10 lbs. per barrel, respectively, and a pH in the range 10.5–13.6.

Any suitable viscosity increasing or weight suspending agent may be employed in the practice of this invention. Particularly suitable as a weight suspending agent is carboxymethylcellulose. Carboxymethylcellulose, when dissolved in water, substantially increases the viscosity thereof and greatly improves the weight suspending characteristics thereof. Usually an amount of viscosity increasing agent or weight suspending agent in the range 1–10 lbs. per barrel of water is satisfactory. Other suitable viscosity increasing or weight suspending agents include flocculated bentonitic type clays, such as bentonite which has been flocculated by an aqueous solution of a water soluble salt, such as an alkali metal or an alkaline earth metal salt, e.g., sodium chloride and the like. This type of material although imparting additional clay solids to the resulting converted fluid does not, however, substantially adversely affect the high temperature gelation properties thereof.

The following actual field trial is illustrative of the practice of this invention. A drilling fluid, actually a low lime oil-in-water emulsion drilling fluid containing a suitable clay dispersant such as a ferrochrome lignosulfonate as the clay dispersing agent, was converted in the following manner.

Maximum mud volume needed to make a packer fluid was 375 barrels. Two mud tanks were used to process a final packer fluid volume of 400 barrels. Approximately 2½ days operation of the mud centrifuge were required to raise the weight of the two tanks of mud from 15.5 lbs. per gallon to about 18.6 lbs. per gallon of which time 4½ hours were required to water back the mud to 17.2 lbs. per gallon, and condition with carboxymethylcellulose (Driscose). The above steps constituted the so-called first stage dewatering and treatment.

The mud centrifuge was started up again and the resulting first stage treated mud subjected to treatment therethrough. This second step treatment operation took approximately 1½ days before the mud weight was 19.8 lbs. per gallon. This resulting mud was then diluted back to 17.3 lbs. per gallon with water and carboxymethylcellulose over a period of 9 hours. This completed the so-called second stage treatment. The total time of the two treatment steps amounted to 4 days and 13½ hours, the mud centrifuge being operated for 47 hours during the first stage and 35 hours during the second stage. The total down time of the centrifuge due to weather conditions or equipment failure amounted to 13½ hours during the first stage and 2 hours during the second stage. After the first stage a total of 0.5 lb. per barrel of carboxymethylcellulose was added to the system and upon the completion of the second stage a total of 0.6 lb. per barrel of carboxymethylcellulose was added.

The resulting converted mud, after completion of the second stage, had a $P_m$ of 3.6, a mud weight of 17.3 lbs. per gallon and a funnel viscosity of 48 seconds and exhibited satisfactory high temperature properties. The above mud conversion operation was then supplemented by a chemical conversion involving the addition of ¾ lb. per barrel of sodium citrate through the mud hopper, followed by the addition of 2 lbs. per barrel of chromium trifluoride through the mud hopper with a small stream of water. No thickening of the mud in the pits occurred although considerable gunning of the pits was necessary in order to properly admix all the materials therein. After the aforesaid treatment the resulting treated mud had the following characteristics:

$P_m$—0.2
Mud weight—17.2 lbs. per gallon
Funnel viscosity—40 seconds
Gel—0–0

To supplement the gel strength ½ lb. per barrel of carboxymethylcellulose was added to the mud. The accompanying Table I sets forth the properties of the mud undergoing treatment. It is to be noted that the high temperature shear value of the mud after completion of the second stage was relatively low, 550 lbs. per hundred sq. ft. as compared with 4200 lbs. per hundred sq. ft. of the original untreated mud.

*Table I*

| Sample and Additions | Mud Properties Before Bombing |||||||  Mud Properties After Bombing ||
|---|---|---|---|---|---|---|---|---|---|
| | Gels || Viscosity || pH | Water Loss, 30' at 100 p.s.i. | $P_m$ | 24 hours, 350° F. | 22 days, 275° F. |
| | 0' | 10' | $V_{600}$ | $V_{100}$ | | | | | |
| Sampled 10-3-57, wt. 17.2#/gal. | 4 / 0 | 13 / 0 | 72.2 | 88.0 | 12.75 | 4.1 | 8.3 | 4200 | |
| Sampled After Stage #1 | 4.5 | 15.0 | 84.3 | 181.2 | 12.39 | 6.5 | 5.5 | 1500 | |
| Sampled After Stage #2 | 4.5 / 0 | 6.1 | 80.5 | 146.1 | 12.05 | 7.7 | 3.4 | 550 | |
| Sampled After Stage #2 and after treatment with 2#/bbl. $CrF_3$ + 3/4#/bbl. sodium citrate | 3.2 / 0 | 20 / 0 | 71.2 | 89.1 | 8.73 | 5.5 | 0.6 | 191 | 190 |

Further illustrative of the practice of this invention wherein a flocculated bentonitic type clay is employed as the viscosity increasing agent or weight suspending agent aqueous admixtures of bentonite-in-water were added to a relatively high density mud sludge obtained from a mud centrifuge, the high density mud sludge having a weight of about 20 lbs. per gallon and having a relatively large solids content. The resulting admixtures were then subjected to a temperature of 350° F. for a period of 24 hours and the shear value thereof measured. The data obtained in these tests are set forth in accompanying Table II.

Table II

| No. | Mixture | Gels | | Vis., Cps. | | $P_m$ | pH | Water Loss, 30' | Bombing | |
|---|---|---|---|---|---|---|---|---|---|---|
| | | 0' | 10' | $V_{600}$ | $V_{100}$ | | | | 350° F. for 24 hrs. Shear | Appearance |
| 1 | 500 ccs. of 2% aqueous bentonite suspension + 250 ccs. centrifuge sludge. | 1, 0 | 1, 0 | 16.0 | 11.5 | 1.1 | 10.8 | 44.0 | 95 | Very fluid. Settled in Bomb. |
| 2 | #1 + 4 lbs./bbl. NaCl | 1, 0 | 4, 0 | 19.1 | 27.6 | 1.1 | 10.65 | 67.2 | 145 | Very fluid. No settling. |
| 3 | 500 ccs. of 4% bentonite + 250 ccs. centrifuge sludge. | 1, 0 | 3.4, 0 | 24.4 | 21.8 | 1.1 | 10.6 | 30.0 | 175 | Do. |
| 4 | #3 + 4 lbs./bbl. salt NaCl | 7.2 | 9.0 | 35.0 | 107.4 | .9 | 10.28 | 33.2 | 175 | Fluid. Slightly thick. No settling. |
| 5 | 500 ccs. of 6% bentonite + 250 ccs. centrifuge sludge. | 2, 0 | 9.0 | 75.0 | 110.8 | 1.2 | 10.53 | 17.6 | 600 | Fluid. Thick. No settling. |
| 6 | #5 + 4 lbs./bbl. NaCl | 50.0 | 60+ | 135+ | 555+ | 1.1 | 10.17 | 22.0 | 580 | Very thick. No settling. |

As indicated in accompanying Table II a flocculated bentonite, such as bentonite flocculated by an aqueous solution of sodium chloride, was satisfactory as a viscosity increasing or weight suspending agent in the preparation of well packer fluids in accordance with the practice of this invention.

As will be apparent in the light of the accompanying disclosure many modifications, changes and alterations are possible and will suggest themselves to those skilled in the art without departing from the spirit and scope of this invention.

We claim:

1. A method of converting an aqueous limed mud into a well packer fluid having relatively improved high temperature properties which comprises dewatering said limed mud by centrifuging to increase the density thereof, incorporating in the resulting dewatered mud a sufficient amount of water and viscosity increasing agent to yield a resulting mud having a density approaching that of the aforesaid limed mud, the $P_m$ value of said resulting mud having been substantially reduced with respect to the aforesaid limed mud, dewatering said resulting mud to increase the density thereof, adding additional water and incorporating in the dewatered resulting mud an additional amount of viscosity increasing agent to yield a resulting packer fluid having a $P_m$ value of less than 5.0 and a shear value when subjected to a temperature of 350° F. for a period of 24 hours of less than about 550 lbs. per sq. ft., wherein $P_m$ is the number of ccs. of N/50 $H_2SO_4$ required to titrate 1 cc. of the whole mud.

2. A method in accordance with claim 1 wherein said viscosity increasing agent is a flocculated bentonitic clay.

3. A method in accordance with claim 1 wherein the $P_m$ of said resulting packer fluid is less than about 3.0.

4. A method in accordance with claim 1 wherein the resulting packer fluid is supplemented by adding thereto minor amounts of sodium citrate and chromium trifluoride.

5. A method in accordance with claim 1 wherein said viscosity increasing agent is carboxymethylcellulose.

6. A method in accordance with claim 5 wherein the resulting packer fluid is supplemented by adding thereto minor amounts of sodium citrate and chromium trifluoride.

7. A method of converting an aqueous limed mud into a well packer fluid having relatively improved high temperature properties which comprises dewatering said limed mud by centrifuging to increase the density thereof and introducing the resulting dewatered mud into an aqueous solution containing a viscosity increasing agent therein, the amounts of said dewatered mud and said aqueous solution being adjusted so that the resulting fluid admixture has a specific gravity approaching that of the aforesaid aqueous limed mud, said fluid admixture having a $P_m$ less than 5.0, and a shear value when subjected to a temperature of 350° F. for a period of 24 hours of less than about 550 lbs. per hundred sq. ft., wherein $P_m$ is the number of ccs. of N/50 $H_2SO_4$ required to titrate 1 cc. of the whole mud.

8. A method in accordance with claim 7 wherein said viscosity increasing agent in carboxymethylcellulose.

9. A method in accordance with claim 7 wherein the $P_m$ of said resulting fluid admixture is less than 3.0.

10. A method in accordance with claim 7 wherein said viscosity increasing agent is a flocculated bentonitic clay.

11. A method of converting an aqueous limed mud into a well packer fluid having improved high temperature properties which comprises adjusting the density of said limed mud by centrifuging to a value greater than the aforesaid limed mud and admixing with the resulting relatively high density mud an amount of water together with a viscosity increasing agent sufficient such that the density of the resulting mud is about that of the aforesaid aqueous limed mud, the $P_m$ of the resulting mud being not greater than 5.0, the shear value of the resulting mud when subjected to a temperature of 350° F. for a period of 24 hours being less than about 550 lbs. per hundred sq. ft., wherein $P_m$ is the number of ccs. of N/50 $H_2SO_4$ required to titrate 1 cc. of the whole mud.

12. A method in accordance with claim 11 wherein said viscosity increasing agent is carboxymethylcellulose.

13. A method in accordance with claim 11 wherein the $P_m$ of said resulting mud is less than about 3.0.

14. A method in accordance with claim 11 wherein said viscosity increasing agent is a flocculated bentonitic clay.

15. A method in accordance with claim 14 wherein said bentonitic clay has been flocculated by contact with an aqueous solution of a water soluble metal salt.

References Cited in the file of this patent

UNITED STATES PATENTS

| | | |
|---|---|---|
| 2,678,697 | Fischer | May 18, 1954 |
| 2,793,996 | Lummus | May 28, 1957 |
| 2,802,783 | Weiss et al. | Aug. 13, 1957 |

UNITED STATES PATENT OFFICE
CERTIFICATION OF CORRECTION

Patent No. 2,969,322            January 24, 1961

Walter J. Weiss et al.

It is hereby certified that error appears in the above numbered patent requiring correction and that the said Letters Patent should read as corrected below.

Columns 3 and 4, TABLE I, eighth column thereof, under the heading "Pm", first line, for "8.3" read -- 8.0 --; column 6, line 38, after "than" insert -- about --; line 41, after "centrifuging" insert -- said mud --.

Signed and sealed this 6th day of June 1961.

(SEAL)
Attest:

ERNEST W. SWIDER
Attesting Officer

DAVID L. LADD
Commissioner of Patents

UNITED STATES PATENT OFFICE
CERTIFICATION OF CORRECTION

Patent No. 2,969,322                              January 24, 1961

Walter J. Weiss et al.

It is hereby certified that error appears in the above numbered patent requiring correction and that the said Letters Patent should read as corrected below.

Columns 3 and 4, TABLE I, eighth column thereof, under the heading "Pm", first line, for "8.3" read -- 8.0 --; column 6, line 38, after "than" insert -- about --; line 41, after "centrifuging" insert -- said mud --.

Signed and sealed this 6th day of June 1961.

(SEAL)
Attest:

ERNEST W. SWIDER                                              DAVID L. LADD
Attesting Officer                                                   Commissioner of Patents